United States Patent [19]

Ibata

[11] Patent Number: 4,526,589
[45] Date of Patent: Jul. 2, 1985

[54] POLISHER ELEMENT
[75] Inventor: Sachiko Ibata, Osaka, Japan
[73] Assignee: Nippon Tenshashi Kabushiki Kaisha, Osaka, Japan
[21] Appl. No.: 599,861
[22] Filed: Apr. 13, 1984

Related U.S. Application Data

[62] Division of Ser. No. 402,675, Jul. 28, 1982, Pat. No. 4,456,500.

[30] Foreign Application Priority Data

Mar. 2, 1982 [JP] Japan .................... 57-33626

[51] Int. Cl.³ .............................................. B24B 1/00
[52] U.S. Cl. ........................................ 51/295; 51/309; 156/634
[58] Field of Search ................ 51/295, 309; 156/634

[56] References Cited

U.S. PATENT DOCUMENTS 3,045,321  7/1962  McDermott ..................... 51/295

Primary Examiner—Paul Lieberman
Assistant Examiner—Willie J. Thompson
Attorney, Agent, or Firm—Griffin, Branigan & Butler

[57] ABSTRACT

In a method of making a polishing element a photoresist film 2 is first deposited on a surface of metal stock 1. A photomask 3 is then used to selectively cover portions of the deposited photoresist film 2. Thereafter, portions of the photoresist film 2 which are not covered by the photomask 3 are removed in order to leave exposed patterned portions 5 of the metal stock surface. Gulf-shaped recesses 6 are then etched into the exposed portions of the metal stock surface. The formation of gulf-shaped recesses 6 results from the application of a etchant while the metal stock 1 and the etchant are in physical motion relative to one another. After etching, remaining portions of the photoresist film 2 are removed from the metal stock. A polishing element 10 comprising cutting teeth 11 having acute cutting action angles results.

4 Claims, 16 Drawing Figures

POLISHER ELEMENT

This is a division of application Ser. No. 06/402,675, filed July 28, 1982, now U.S. Pat. No. 4,456,500.

BACKGROUND

This invention relates to a method of manufacturing a polishing element, and particularly to a method of manufacturing an essentially all-metallic polishing element useful for finishing surfaces of both metal and nonmetal objects.

Polishing tools such as files or sandpapers have traditionally been used to polish the surfaces of nonmetal objects (like wood, bamboo, or synthetic resin, for example,) or to polish the surfaces of metal objects (such as aluminum, brass, copper, steel, or the like).

Files are polishing tools made from metallic stocks which, when finished, have teeth formed on one or more surfaces thereof. The teeth have customarily been formed on the files by punching the surfaces of the metallic stock with a chisel. Unfortunately, this method is not easily adaptable to efficient mass-productive techniques. Furthermore, neither the tops of the teeth nor the finished sides of the teeth on the files formed by this method are flat and smooth. In this regard, files having teeth whose tops and sides are not flat and smooth are susceptible to a clogging phenomena which occurs in the recessed parts of the file. Clogging becomes even more apparent when a file is used on nonmetal objects. In addition, due to the extreme difficulty in narrowing the gaps between teeth, files have not generally been considered suitable tools for the final steps required for fine finishing or polishing.

Sandpapers are made by sticking abrasive particles onto a paper or a cloth. Sandpapers can be used for final finishing touches since their faces have very fine meshes. However, during the polishing operation abrasive particles adhered to sandpapers tend to break loose. Not only does the detachment of the abrasive particles shorten the life of the sandpaper, but the particles which come off are a potential cause of further problems. While the pliability of sandpaper permits it to be used with a holder, particle detachment occurs even when a holder is employed.

Whenever a file or sandpaper is utilized, fine scratches can be left on a surface being polished. The arrangement of teeth (in the case of a file) of the arrangement of abrasive particles (which essentially function as teeth in the case of sandpaper) cannot be strictly regulated and hence contribute to the fine scratches left on the finished polished surface.

A file foil is publicly disclosed in Japanese Pat. No. 51-9958 for overcoming problems such as those described above which attend existing polishing tools. The file foil is made of metal but is unlike ordinary files which have metal recesses at points where the file teeth intersect. That is, on the file foils of Pat. No. 51-9958 the teeth run without a break on the file surface. In addition, the arrangement of the teeth on the file foils is strictly regulated. Yet the file foils are thin and generally lack rigidity. Consequently, the file foils are prone to be damaged.

Some embodiments of the file foils disclosed in Japanese Pat. No. 51-9958 are adapted to mate with a holder for use. However, when the teeth on the file foils are worn-out, the entire unit including both the file foil and the holder are thrown away. Disposal of the entire unit is neither economical nor advantageous in a waste conscious society. File foils adhered to a holder for use as a polishing tool are not always as durable as desired or are unsuitable for long periods of use. In this respect, the non-rigid file foils tend to detach from a holder under certain conditions of adhesion or very stressful polishing work.

The embodiments of the file foils disclosed in Japanese Pat. No. 51-9958 have a cutting action angle (an angle between a top face of a tooth and a side of the tooth) which becomes wider than 90° (i.e., becomes an obtuse angle). A cutting action angle wider than 90° results in a less than optimum polishing performance. In fact, in cross section the teeth of the file foils disclosed in Japanese Pat. No. 51-9958 are essentially semi-circular. The semi-circular shape of the file teeth result from the electrolytic and reducing methods used in making both the file foil and a metallic mold therefore. In this respect, Japanese Pat. No. 51-9958 is incorporated herein by reference, particularly the steps included in the method of manufacturing such file foils. With respect to the steps of this method, the file foil teeth must be formed in essentially semi-circular shape in order to remove the file foil from its associated metallic mold. Otherwise, considerable difficulty would arise when removing the file foil from the mold. Thus, file foils produced in accordance with the method of Japanese Pat. No. 51-9958 have cutting action angles greater than 90° and teeth which tend to lack the desired rigidity.

In view of the foregoing deficiencies of existing polishing elements, it is an object of this invention to provide a method of manufacturing an essentially all-metallic polishing element having superb rigidity and durability.

An advantage of the present invention is the provision of a method of manufacturing a polishing element which is easily and economically mass-produced.

A further advantage of the present invention is the provision of a method of manufacturing a polishing element whose utilization results in smooth, long-lasting finished surfaces yet which requires less expenditure of effort.

SUMMARY

In a method of making a polishing element a photoresist film is first deposited on a surface of metal stock. A photomask is then used to selectively cover portions of the deposited photoresist film. Thereafter, portions of the photoresist film which are not covered by the photomask are removed in order to leave exposed patterned portions of the metal stock surface. Gulf-shaped recesses are then etched into the exposed portions of the metal stock surface. The formation of gulf-shaped recesses results from the application of a etchant while the metal stock and the etchant are in physical motion relative to one another. After etching, remaining portions of the photoresist film are removed from the metal stock. A polishing element comprising cutting teeth having acute cutting action angles results.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
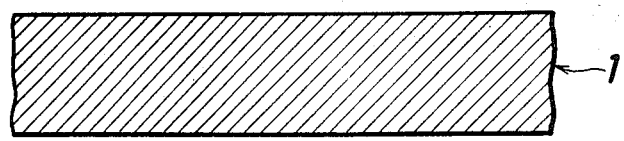
FIGS. 1–7 are schematic cross-sectional views depicting process steps suitable for the manufacture of a polisher according to a mode of the invention.

According to the modes of the present invention a polishing element is manufactured by initially selecting a piece of metal stock 1 as a starting material from among various suitable metals of the type which can be etched with a etchant. The shape of the metal stock 1 can be, for example, either that of a plate or a block. In the case of a block-shaped stock the stock may be either square or round. In an example shown in FIG. 1, a steel plate is selected as a metal stock 1.

Figure 2:
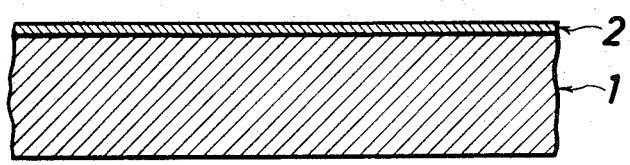
Figure 3:
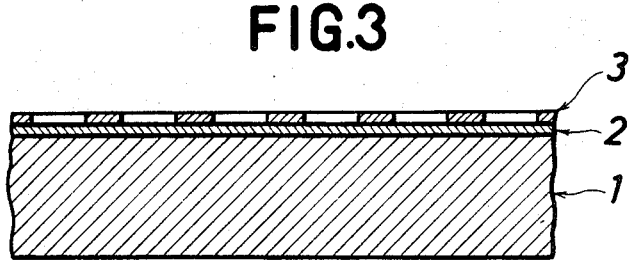

A photoresist film 2 which is resistant to corrosion is coated on the surface of the metal stock 1 as shown in FIG. 2. It should be understood that the resultant abrasive working portion of the polisher need not necessarily be limited to one side of the metal stock 1 but can, if desired, be formed on more than one side of the stock 1. To simply the discussion with reference to the examples of the illustrations, the abrasive working surface is formed on the front side (upper side) of the steel plate. However, the reverse side (bottom side) can also be fabricated to have an abrasive face.

Next, a "pre-baking" treatment is given to the photoresist film 2. Thereafter a pattern of teeth to be formed in a stock 1 is made with a device such as a micro-plotter or the like, which is contracted to produce a precision photo-plate or photomask 3. The photomask 3 has a pattern of solid portions corresponding to teeth to be formed in the stock 1 as well as vacant portions between the teeth. The photomask 3 is then laid over the photoresist film 2 to shield portions of the photoresist film during an exposure and development step wherein unmasked portions of the photoresist film 2 are removed.

Figure 4:
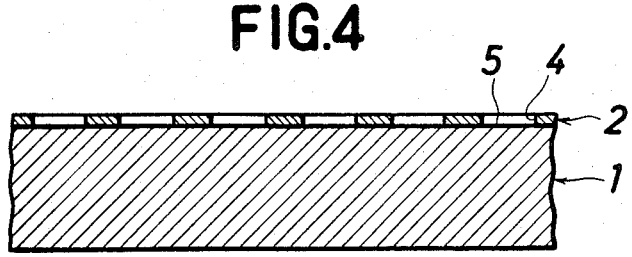

The photoresist film which remained on the metal stock 1 through the development process is then treated for post-baking. In the post-baking step a plurality of openings 4 which positionally correspond with the pattern of vacant portions of the photomask 3 are made on the photoresist film 2 as illustrated in FIG. 4 to form exposed metallic parts 5 ready for etching.

Figure 5:
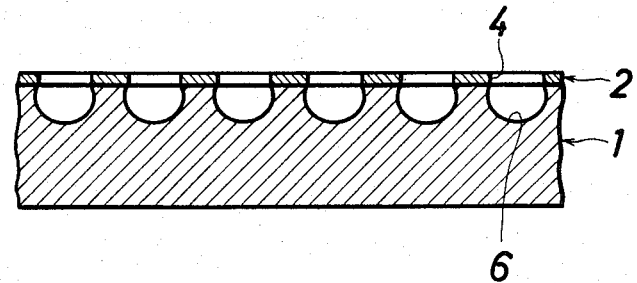
Figure 7:
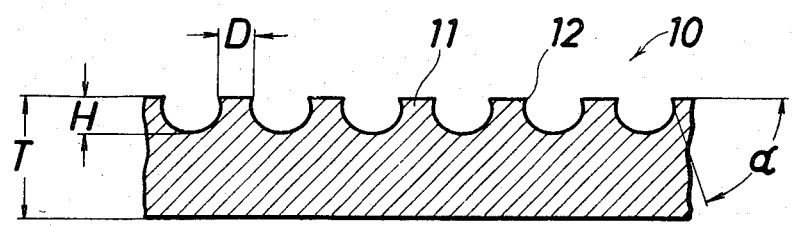

During etching, exposed parts 5 of the metal stock 1 are chemically corroded by application of an etchant. In the etchant process relative physical motion occurs between the stock 1 and the etchant. The relative physical motion of the stock 1 and the etchant causes the etchant to corrode more deeply into the metal stock 1 and facilitates lateral etching. That is, the relative physical motion facilitates the undercutting of portions of the metal stock which lie under the photoresist film 2. The etching results in the formation of a plurality of gulf-shaped recesses 6 in the metal stock 1 as illustrated in FIGS. 5 and 7, for example. A gulf-shaped recess is an arc-like recess (and in some embodiments an essentially semi-oval shaped recess) formed between the teeth 11. As illustrated in the Figures, each tooth 11 is bordered by the upper surface of metal stock 1 and the arc-like contours of the adjacent recesses 6. A tangent to the etched recess arc near the point of recess intersection with the upper etched surface of the metal stock 1 intersects the surface of the metal stock 1 at an interior angle alpha ($\alpha$) which is less than 90°.

Figure 6:
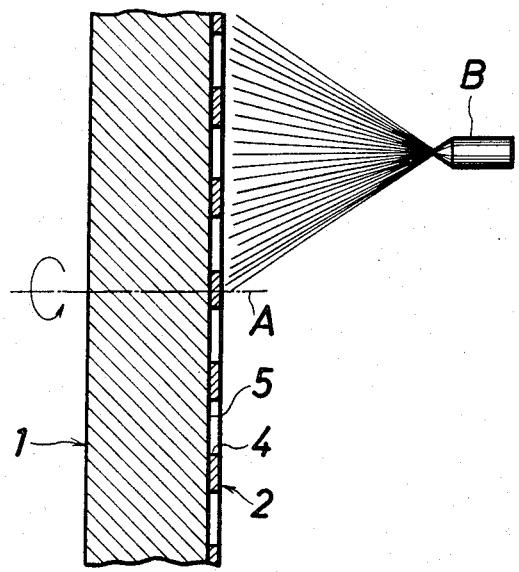

The relative physical motion of the metal stock 1 and the etchant can be effected in a number of ways. For example, in one embodiment the metal stock 1 with its exposed part 5 is deposited into a tub filled with etchant and soaked while the metal stock is moved both laterally and vertically. In another embodiment, etchant is sprayed onto a metal stock 1 with its exposed parts 5. In FIG. 6, for example, stock 1 with its exposed parts 5 rotates about its axis A while etchant is sprayed from a fixed nozzle B onto the exposed parts 5. The etchant is evenly sprayed onto the exposed parts 5 while the metal stock 1 is rotating, resulting in the formation of gulf-shaped recesses 6 by the etching process.

Alternatively, the metal stock 1 is, in another embodiment, fixed while nozzle B moves. As another alternative, both the nozzle B and the metal stock 1 rotate. In an even further alternative, a plurality of rotating nozzles B are provided and the metal stock 1 remains fixed so that entire surface of the metal stock 1 including the exposed part 5 is sprayed.

After completion of the etching process, the remaining photoresist film 2 is removed by conventional techniques.

The above steps of the disclosed method result in the formation of a raised tooth 11 between the adjacent gulf-shaped recesses 6 as illustrated in FIG. 7. Thus, a metallic polisher 10 having a plurality of teeth 11 is obtained.

The teeth 11 on the polisher 10 have flat tops, but the teeth side faces are curved like an arc as described above. The blade 12 is formed at the boundary line or the intersection between the top face and its side face. The cutting angle $\alpha$ between the top face and the side face is an acute angle. That is, the angle alpha is narrower than 90°. Preferably the cutting action angle alpha is in the range of 40°–70°.

Figure 8:
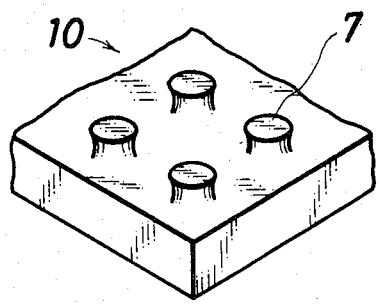
FIG. 8 is a perspective view of a polisher having a plurality of essentially cylindrically-shaped teeth.

The teeth formed on the polisher can be arranged in numerous shapes and patterns as desired. FIGS. 7 and 8 illustrate an essentially all-metallic polisher 10 having essentially circular-shaped teeth 11. The teeth 11 were formed by using a photomask having a plurality of circles arranged at set intervals to cover a metal stock 1 of steel having a thickness T (T equaling 0.5 mm). In this example, the maximum tooth diameter D is 0.13 mm; tooth height H is 0.13 mm; and, the cutting action at angle alpha is 70°.

Figure 9:
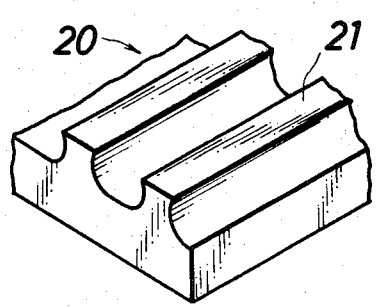
FIG. 9 is a perspective view of a polisher with stripe-shaped teeth.

FIG. 9 illustrates an essentially all-metallic polisher 20 made from a metal plate with teeth 21 in the shape of raised stripes.

Figure 10:
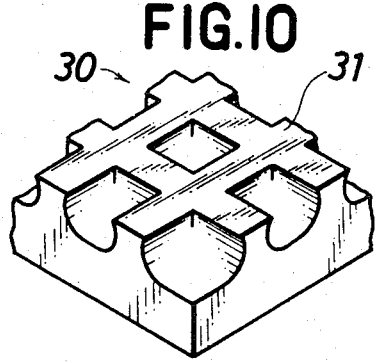
FIG. 10 is a perspective view of a polisher with strip-shaped teeth intersecting laterally and vertically.

An essentially all-metal polisher 30 illustrated in FIG. 10 is also made from a steel plate. The polisher of FIG. 10 has teeth 31 which are formed with raised stripes running both laterally and vertically to intersect one another. Like an embodiment of a file foil disclosed in Japanese Pat. No. 51-9958, the top face of the raised teeth stripes intersect each other. Unlike ordinary files, however, no recesses occur at points where the stripes intersect.

It should be understood that many patterns of teeth can be formed in the metal stock 1 and the number and types of such patterns should not be limited to those mentioned herein. Furthermore, the metal stock need not necessarily be of a plate shape. Square, round, or block shaped stocks can be employed. In some embodiments the teeth are even formed on a surface of a block-shaped metal stock which is grasped by or mated with a holder.

Depending upon its thickness, a plate-shaped polisher may have sufficient rigidity to be used in polishing operation without the need of a supporter or holder. A polisher can, of course, be attached to a holder even if it were to have sufficient rigidity in its own right. The shapes of the holders can very depending on the type of the work or the place of the work.

Figure 11:
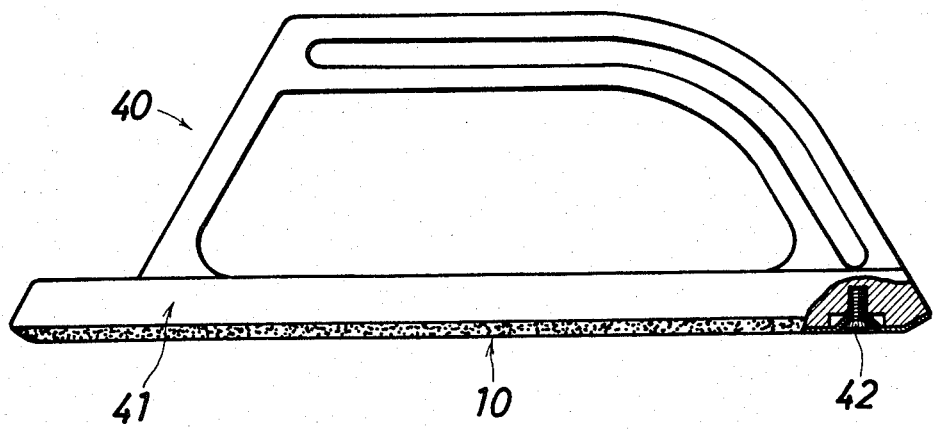
FIG. 11 is a partial, vertical elevation of a polisher with a plurality of essentially cylindrically-shaped teeth, the polisher being attached to a holder.
Figure 12:
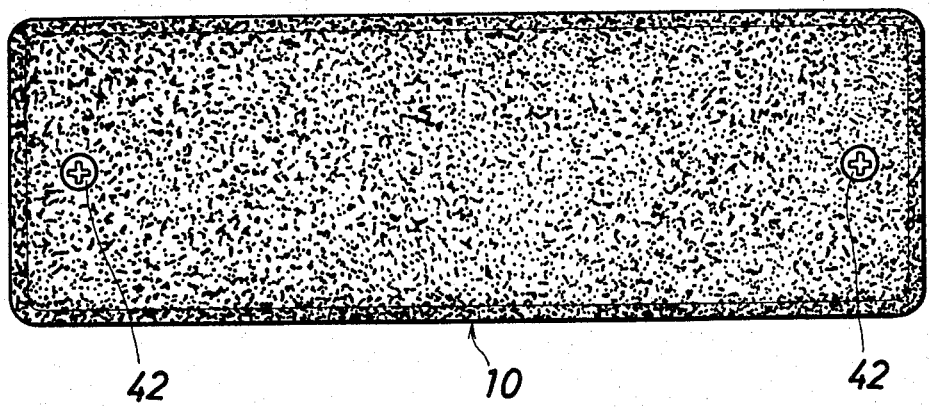
FIG. 12 is a bottom view of FIG. 11.

When is to be used in conjunction with a holder, the polisher is cut to an appropriate size and pressed-formed so that it can be easily attached to the holder. Attachment may be accomplished by various methods. For example, FIGS. 11 and 12 show a polishing tool 40 in which a plate-shaped polisher 10 is attached to a holder 41 using nuts 42. Tool 40 is ideal for polishing a wide plane.

Figure 13:
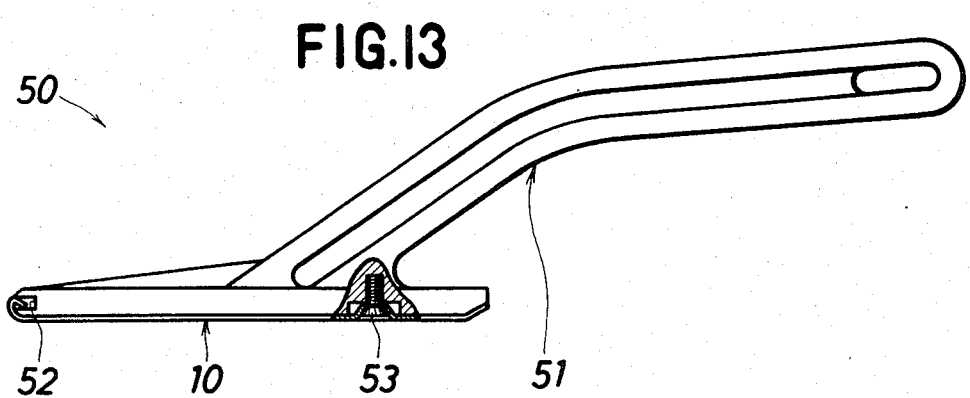
FIG. 13 is an elevational view of a polisher attached to another type holder to be used as a polishing tool.
Figure 14:
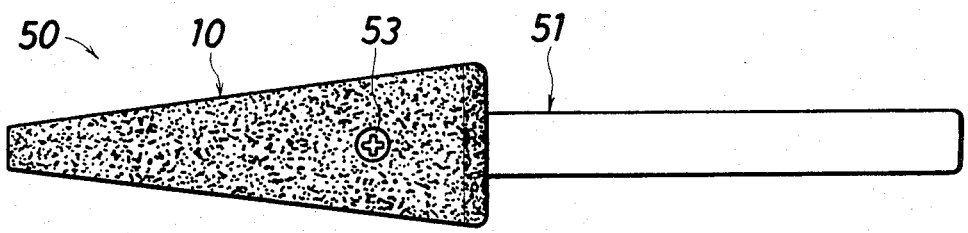
FIG. 14 is a bottom view of FIG. 13.

FIGS. 13 and 14 show a polishing tool 50 useful for narrow corners. Accordingly, the polisher 10 is triangle-shaped and the tip of the polisher is bent so that it can be attached to a hook 52 of the holder 51. The rear part of the polisher is secured with a nut 53.

As suggested above, the shapes of the polishing tool can be altered depending upon the purpose of the tool. For instance, a cylindrical holder can be wrapped with a polisher to polish the inside of a hole.

In various embodiments plate-shaped polishers are secured to holders which have surfaces which are either raised or recessed. The polishers can also be press-formed to form raises or recesses facilitating easier polishing work on curved surfaces.

Furthermore, for coarse polishing a polisher can be secured to a holder having either raised or recessed surfaces or both; or, the plate-shaped polisher can be pressed-formed to make a raised or recessed surface.

Figure 15:
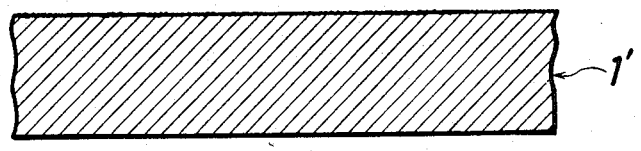
FIG. 15 is a schematic sectional view of a piece of metal stock having a coarse face; and, FIG. 16 is a schematic sectional view of a polisher formed by utilizing the piece of metal stock of FIG. 15.
Figure 16:
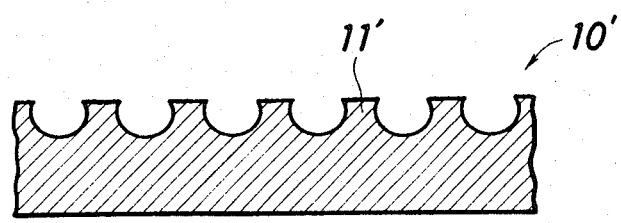

An essentially smooth metal stock is useful for the production of various embodiments of metal polishers, but smooth metal stocks need not be used exclusively. For instance, as illustrated in FIG. 15, a polisher can be made from a piece of metal stock 1' having a coarse surface. For this case, the top face of the tooth 11' remains coarse as shown in FIG. 16. The essentially all-metallic polisher 10' facilitates more delicate polishing work by virtue of its coarse surface.

Other steps are includable along with the methods described above. For example, the rigidity of the teeth of a polisher is enhanced when a heat treatment is provided for the surface on which the teeth are formed. Enhanced tooth rigidity assures longer life and better quality of the polisher. Furthermore, as a quench hardening operation a heat treatment can be given only to the surface part of the metal stock upon which the teeth are formed. Inasmuch as quenching is done only to the surface part of the polisher, no difficulty arises when the polisher is bent to conform to a holder as shown in FIGS. 11-14. Thus, the polisher can assume various shapes and undergo deformation after quenching. Of course, if desired, rather than quench the surface part only the whole part of the polisher may be quenched after the process of shaping is completed.

As described above, the present invention provides a method of producing a highly effective polisher. The modes of the method of the present invention have various advantages:

The method advantageously employs metal stock and a particular photo-etching process step to form a polisher. Depending upon the selection of the appropriate metal stock, a rigid essentially all-metallic polisher can be made which need not be used with a support. If desired, however, the polisher can be attached to an appropriate holder.

A photo-etching process step of the invention includes the impartation of physical, relative motion of the metal stock and its exposed parts with respect to an etchant to form teeth with an acute cutting angle. Moreover, the process results in a smooth, uniformly finished working surface upon the expiration of less effort.

The process of the invention reduces the time required for corrosion due to the relative motion of the metal stock and its exposed part with respect to the etchant, thereby shortening the manufacturing time.

If metal stock having a coarse face is employed in the process, the top face of teeth formed on the metal stock remains coarse. Polishing performance is improved for many jobs by the provision of a coarse face.

A polisher with teeth of enhanced hardness is formed in the mode of the invention wherein a heat treatment is applied only to the working surface on which the teeth are formed. Hardened teeth assure the longer like and superior quality of the polisher. The polisher may be bent or conformed to a desired shape after the heat treatment.

In another mode of the invention, polishing performance is further enhanced by making the top face of the teeth coarse and quenching only the coarse abrasive surface.

While the invention has been particularly shown and described with reference to the preferred embodiments thereof, it will be understood by those skilled in the art that various alternations in form and detail may be made therein without departing from the spirit and scope of the invention.

The embodiments of the invention in which an exclusive property or privilege is claimed are defined as follows:

1. A polishing element comprised of etchable metal stock and produced by a process whereby said metal stock has a plurality of recesses etched on a coarse surface thereof so as to form hardened cutting teeth, said process including the steps of:
    depositing a photoresist film on said coarse surface of said metal stock;
    using a photomask to selectively cover portions of said photoresist film;
    removing portions of said photoresist film, thereby leaving portions of said metal stock coarse surface uncovered;
    etching recesses in said uncovered portions of said metal stock coarse surface by applying an etchant while said metal stock and said etchant are in physical motion relative to each other, thereby forming cutting teeth having teeth tops lying essentially in the plane of said metal stock coarse surface and teeth sides which at least partially define said recess, the interior angle between said teeth top and teeth side being an acute angle;

removing remaining portions of said photoresist film from said metal stock; and, hardening said coarse surface portions of said metal stock on which said cutting teeth are formed.

2. The product of process claim 1, wherein said process further comprising the step of securing the polishing element to a holder.

3. The product of claim 1, wherein in said process said interior angle between said teeth top and teeth side is in the range of 40° to 70°.

4. The product by process of claim 1, wherein said process further comprises the step of bending the metal stock in conformity to a desired shape.

* * * * *